March 13, 1962 G. L. CLAPPER 3,025,415

BISTABLE TRANSISTOR CIRCUIT

Filed March 24, 1958 3 Sheets-Sheet 1

INVENTOR
GENUNG L. CLAPPER

BY G. R. Gugger
AGENT

March 13, 1962 G. L. CLAPPER 3,025,415

BISTABLE TRANSISTOR CIRCUIT

Filed March 24, 1958 3 Sheets-Sheet 2

United States Patent Office 3,025,415
Patented Mar. 13, 1962

3,025,415
BISTABLE TRANSISTOR CIRCUIT
Genung L. Clapper, Vestal, N.Y., assignor to International Business Machines Corporation, New York, N.Y., a corporation of New York
Filed Mar. 24, 1958, Ser. No. 723,535
2 Claims. (Cl. 307—88.5)

This invention relates to bistable circuits including semiconductor devices and more particularly to a transistor circuit having the properties of a gas tube or thyratron.

As is well known, a thyratron is a gas-filled tube wherein, if the grid is made sufficiently positive wtih respect to the cathode, ionization will take place and the grid will lose control and can no longer be used to cut off the anode circuit. The anode circuit can only be stopped by lowering the anode voltage below ionization potential or opening the anode circuit. Thyratrons have their most extensive use in control circuits such as might be used to pick up relay devices which require, in effect, that the circuit be latched up in either one of two stable states. In present day electronic machines which employ large numbers of control circuits, for example, there exists a great need from the standpoint of economy, efficiency and the reduced power requirements for a solid state device, such as a transistor, which can be employed as the equivalent of the thyratron.

Accordingly, the principal object of the present invention is the provision of a circuit employing solid state devices and having the properties of a gas tube.

A further object of the present invention is the provision of a bistable circuit employing transistors and means whereby the transistor input loses control as in the case of a gas thyratron.

A further object of the present invention is the provision of a circuit having a transistor inverter connected to a transistor emitter follower in a manner so that any current flowing in the collector circuit of the emitter follower adds to the base current of the inverter.

Other objects of the invention will be pointed out in the following description and claims and illustrated in the accompanying drawings, which disclose, by way of example, the principle of the invention and the best mode, which has been contemplated, of applying that principle.

In semiconductive materials such as germanium or silicon, the electrical currents, according to presently accepted theory, are carried by electrons designated as "excess" electrons or by "holes" which are defect or missing electrons. According to the theory, a "hole" may be viewed as a carrier of a positive electric charge and an electron as a carrier of a negative electric charge. Electron or "hole" carriers are designated generically by the term "mobile charges."

A semiconductive material is called excess or N type when the mobile charges normally present in excess in the material under equilibrium conditions are electrons.

N type semiconductive material passes current easily when the semiconductive material is negative with respect to a conductive connection thereto.

A semiconductive material is called defect or P type when the mobile charges normally present in excess in the material under equilibrium conditions are holes. P type semiconductive material passes current easily when the semiconductive material is positive with respect to a conductive connection thereto.

Two principal classes of semiconductor devices have been developed which have been referred to in the art as the "point contact transistor" and the "junction transistor." As the name implies, one form of junction transistor includes a semiconductive body having alternate zones of N and P type material forming between junctions or barriers. Electrodes are placed in low-resistance contact with the discrete zones of the material and have been given the names of "collector" electrode, "base" electrode and "emitter" electrode. The collector electrode and the emitter electrode are in contact with the end zones of the semiconductive body, and the base electrode is in contact with the intervening zone of the semiconductive body.

The alternate zones of the body of the junction transistor may be in the series N-P-N or in the series P-N-P. In a base input, grounded emitter circuit, a positive input pulse applied to the base electrode of a P-N-P junction transistor will cause the current flowing from the collector to decrease; whereas, a positive input pulse applied to the base electrode of an N-P-N junction transistor will cause the current flowing into the collector to increase. Thus, P-N-P and N-P-N transistors have complementary operating characteristics.

Figure 1:
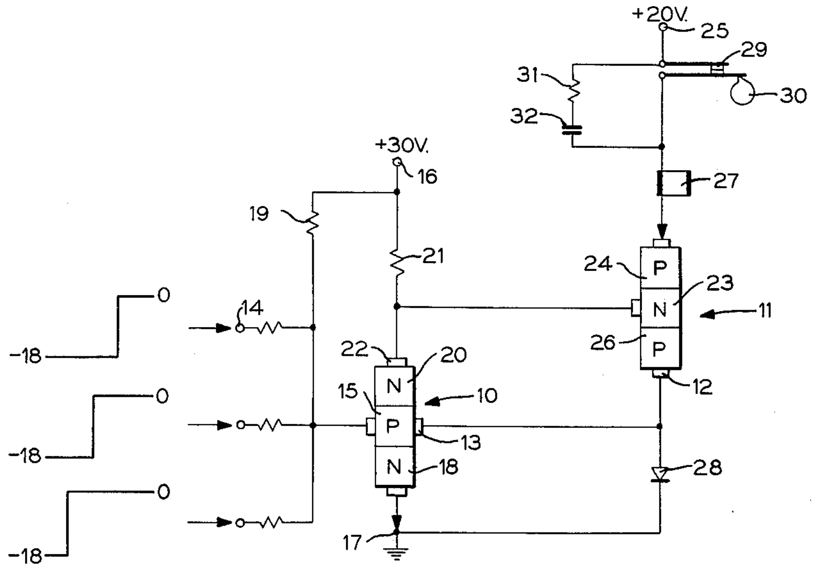
FIG. 1 is a diagram representing one illustrative embodiment of the present invention used as a relay pickup device.

In accordance with a preferred embodiment of the present invention, the circuit shown in FIG. 1 is composed of an N-P-N transistor 10 operating as an inverter (grounded emitter configuration) connected to a P-N-P transistor 11, which is of the opposite conductivity type and operates as an emitter follower (grounded collector configuration). The collector electrode 12 of the P-N-P transistor 11 is connected to the base electrode 13 of the N-P-N transistor 10 so that any current flowing in the collector circuit of the emitter follower adds to the base current of the inverter. This produces a very strong positive feedback similar to the action of the thyratron. This circuit is a direct replacement for a thyratron when used as a relay pickup device. A tube such as the 2D21, for example, is often used as a positive coincidence switch in a relay application, the input signals upon the two grids being necessarily coincident in time to fire the thyratron and pick up the relay. In the present circuit three inputs may be used if desired. If unused, one input may be allowed to float or it may be permanently connected to ground (0 volts).

It is necessary that all three inputs be at 0 volts in order to fire the device and pick up the relay. When all three inputs 14 are at 0 volts, the base 15 of the N-P-N inverter is brought from a negative potential to a potential slightly above ground. As a result, current flow takes place from the positive 30 volt terminal 16 to the ground terminal 17 and the current in the base-emitter circuit comprising the emitter 18, base 15 and resistor 19 induces current in the collector circuit which comprises the collector 20 and resistor 21. The resultant drop in voltage at the collector electrode 22, caused by the current flowing in the resistor 21, initiates current flow in the P-N-P base-emitter circuit, comprising the base 23 and emitter 24, from the positive 20 volt terminal 25. This causes current to flow in the collector 26 of the P-N-P transistor and increases the current flowing in the N-P-N transistor resulting in a sharp increase in the current flowing in both transistors. Of course, as the current in the N-P-N inverter keeps increasing, the potential at the collector electrode 22 keeps dropping and the P-N-P emitter follower current keeps increasing and adding to the base current of the inverter via the base electrode 13. Current, which may be in the order of several hundreds of milliamperes if a power transistor is used in the P-N-P position, flows through the relay coil 27 which is connected in the emitter circuit of the P-N-P transistor. A diode 28 with a high forward conductance is used to bypass the base-emitter of transistor 10 in order to share some of the current.

With high currents flowing in the diode 28 and the transistors 10, 11, the inputs 14 lose control just as in the case of the gas thyratron since the large emitter and collector currents maintain the base 15 of the inverter N-P-N above ground creating the desired latch-up effect. In order to drop out relay 27, normally closed contacts 29 are provided which may be opened by a suitable cam 30 or the like. When contacts 29 open, the latch-up effect ceases; and, if any one of the inputs 14 are negative, the base 15 of the N-P-N inverter drops to a level that assures its cutoff. Current then ceases to flow in the collector circuit and the collector electrode 22 rises to about positive 30 volts which is high enough to bias off the P-N-P when the dropout contacts 29 again close. At this time, practically no current flows in either transistor and the relay 27 remains de-energized until the next coincidence of input pulses.

At the time that the contacts open, current will flow through the suppressor circuit around the contacts, comprising resistor 31 and capacitor 32, and the voltage will rise to about positive 30 volts. When the capacitor 32 becomes charged, current will cease flowing from the positive 20 volt supply to the relay coil.

In the early stage of conduction, the diode 28 in the P-N-P collector circuit reinforces regeneration. Instantaneously, the forward reistance of the diode appears larger than the impedance of the base-emitter diode of the N-P-N and most of the P-N-P collecetor current, therefore, is at first shunted to the base of the N-P-N. Then, as the thyratron action progresses, the current increases and the forward resistance of the diode becomes low. At this time, the diode will shunt a large part of the current away from the N-P-N inverter.

Figure 2:
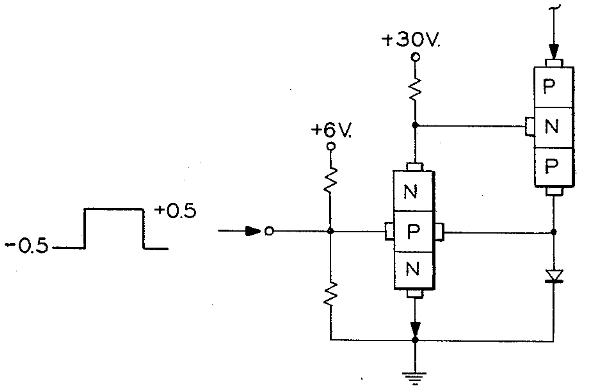
FIG. 2 is a diagram representing a modification of the embodiment shown in FIG. 1 operated by a small signal swing.

The circuit illustrated in FIG. 2 shows a current mode input wherein the N-P-N transistor is operated by a small signal swing produced by current flowing in a relatively low impedance as in current switching circuits. The action of the circuit is the same as the circuit described above and shown in FIG. 1, once the N-P-N base is brought to slightly above 0 volts.

Figure 3:
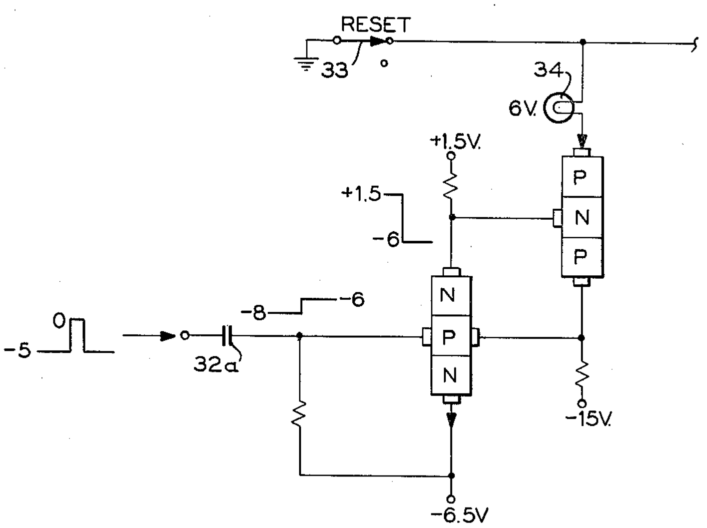
FIG. 3 illustrates another embodiment of the present invention used as a storage device.

The circuit illustrated in FIG. 3 shows the use of the transistor thyratron as an indicator latch or storage device. Here, a short pulse from an error detection circuit, for example, would suffice to produce a long time indication. A reset switch 33 which may be a manually operated push button could be used to extinguish the indicator lamp 34. The 5 volt circuitry and 6 volt bulb are shown by way of illustration and these values are not necessary to the correct performance of the circuit.

Figure 4:
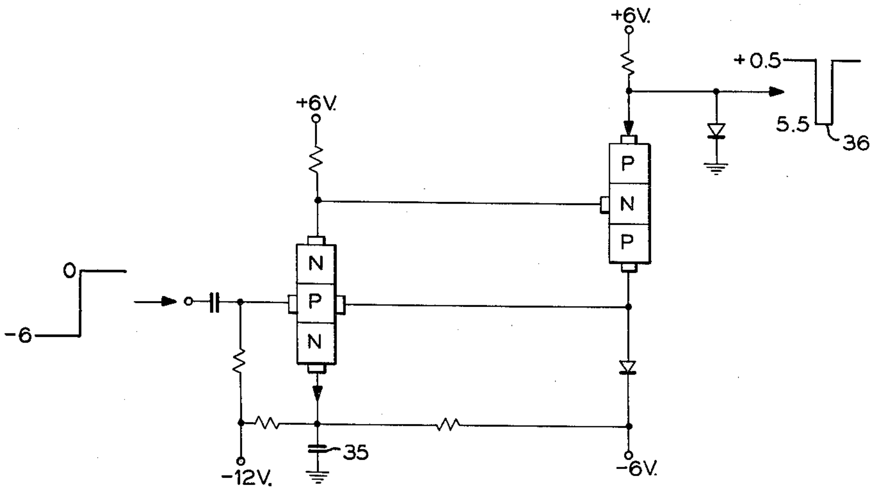
FIG. 4 illustrates still another embodiment of the present invention to produce a single shot pulse generator.
Figure 5:
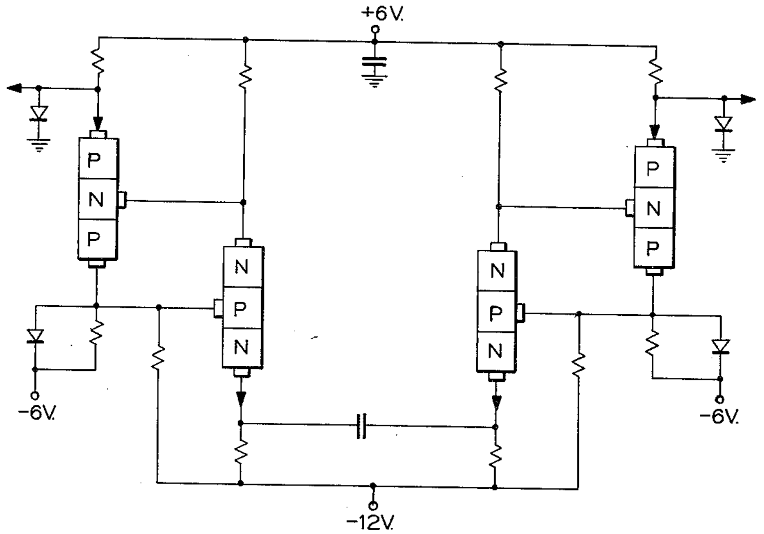
FIG. 5 illustrates the embodiment shown in FIG. 4 modified to produce a multivibrator.

The circuit illustrated in FIG. 4 shows a use wherein the thyratron action terminates automatically to produce a single shot pulse generator by virtue of the capacitor 35 connected in the base-emitter circuit of the N-P-N transistor. The driving capabilities of such a circuit may be made rather high. Two of these circuits can be used to make a high performance multivibrator circuit with the inputs and outputs cross-coupled through a common capacitor connecting the emitters of the N-P-N transistors, as shown in FIG. 5. The width of the single shot output pulse 36 or the frequency of the multivibrator is a function of the capacitance of the capacitor 35.

Figure 6:
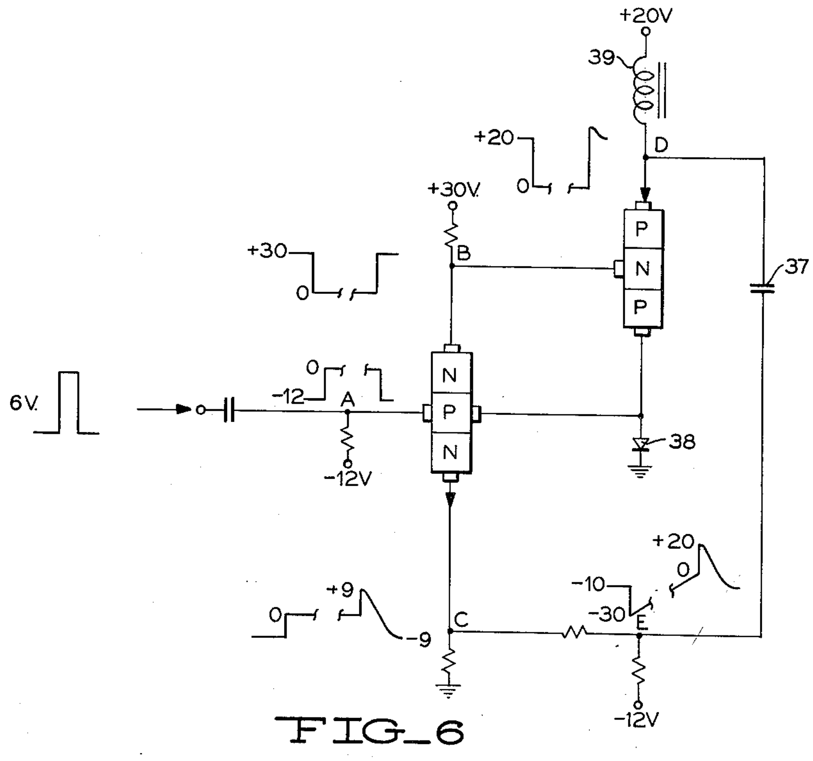
FIG. 6 illustrates the embodiment shown in FIG. 4 modified to produce a pulse stretcher.

In the modification illustrated in FIG. 6, the transistor thyratron has been applied as a pulse stretcher by connecting the capacitor 37 back to the output instead of to ground as was the case for the pulse generator shown in FIG. 4. The 6 volt pulse rise is instantly reflected at point A and when A reaches a potential of around a negative 9 volts, the N-P-N transistor goes into conduction, the potential at point B drops to start the P-N-P transistor conducting, and the current flowing in the collector circuit of the P-N-P emitter follower is added to the base current of the N-P-N inverter to sustain the thyratron action.

As shown by the wave forms in FIG. 6, the positive current flow places the potential at points A, B, C and D at ground and the 20 volt drop at point D is instantly reflected at point E, through the capacitor 37, and point E is driven to a negative 30 volt potential. As a result, positive current flow takes place from point B, inverter N-P-N, points C and E, capacitor 37, point D, emitter follower P-N-P, and the diode 38 to ground and the transistors remain in conduction. As capacitor 37 charges, the potential at point E rises and when it reaches ground potential the N-P-N inverter will cut off and the resulting 30 volt rise at point B will cut off the P-N-P emitter follower. It will be noted that point D rises to approximately a positive 28 volt potential due to the inductive current from the coil 39 and consequently the drop of potential at point A from 0 to negative 12 volts is delayed slightly until the base of the P-N-P transistor becomes positive with respect to the emitter.

The diode 38 is used to tie the emitter follower circuit to ground and facilitates cut off of the N-P-N transistor due to the fact that the base is held at ground potential while the emitter is forced up by the positive feedback from coil 39 through capacitor 37. The width of the output pulse at D is determined by the capacitance of the capacitor 37.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A bistable amplifier circuit comprising a first transistor operable as an inverter, a second transistor operable as an emitter follower, each of said transistors having a base, an emitter and a collector, a source of fixed reference voltage connected to the emitter of said inverter, a load device connected to the emitter of said emitter follower, a power source for said load device which is independent from said reference voltage, input signal means connected to the base of said inverter for overcoming said reference voltage to render said inverter conductive, means connecting the collector of said inverter with the base of said emitter follower and effective during conduction of said inverter for rendering said emitter follower conductive to switch current from said power source through said load device, means connecting the collector of said emitter follower with the base of said inverter for adding current flowing in the collector circuit of said emitter follower to the base current of said inverter whereby said transistors operate as a thyratron and a variable shunting forward biased diode around the base-emitter junction of said inverter for controlling the current from said emitter follower to said inverter as said circuit latches up as a thyratron.

2. A bistable amplifier circuit comprising first and second transistors of opposite conductivity types and each having a base, an emitter and a collector, said first transistor having a grounded emitter configuration, said second transistor having a grounded collector configuration, means connecting the base of each of said transistors to the collector of the other, input signal means connected to the base of said first transistor for biasing same into conduction, a resistor in the collector circuit of said first transistor and effective during conduction of said first transistor for biasing said second transistor into conduction, the current flowing in the collector circuit of said second transistor adding to the base current of said first transistor whereby said transistors operate as a thyratron and said input signal means loses control, a load device connected to the emitter of said second transistor, an isolated voltage source connected to said load device whereby a small input signal to said first transistor will produce a substantial current flow in said second transistor and load device, and a forward biased diode connected between the collector of said second transistor and the grounded emitter of said first transistor and which is effective to initially shunt current to the base of said first transistor and, then, as thyratron action increases, to shunt a large part of current away from said first transistor.

References Cited in the file of this patent

UNITED STATES PATENTS

| | | |
|---|---|---|
| 2,461,895 | Hardy et al. | Feb. 15, 1949 |
| 2,644,087 | Desch | June 30, 1953 |
| 2,655,609 | Shockley | Oct. 13, 1953 |
| 2,829,257 | Root | Apr. 1, 1958 |
| 2,829,308 | Foote | Apr. 1, 1958 |
| 2,843,320 | Chisholm | July 15, 1958 |
| 2,844,781 | Adelman | July 22, 1958 |
| 2,890,353 | Van Overbeek | June 9, 1959 |
| 2,896,094 | Moody | July 21, 1959 |
| 2,904,758 | Miranda | Sept. 15, 1959 |
| 2,907,896 | Yii | Oct. 6, 1959 |

FOREIGN PATENTS

| | | |
|---|---|---|
| 200,400 | Australia | Dec. 7, 1955 |

OTHER REFERENCES

A.I.E.E. Transactions Papers No. 57–196, "Transistor Nor Circuit Design" by Rowe et al., made available for printing December 7, 1956.